Sept. 24, 1929.  R. EISERMANN  1,728,961
LIQUID LEVEL INDICATOR
Filed March 30, 1927
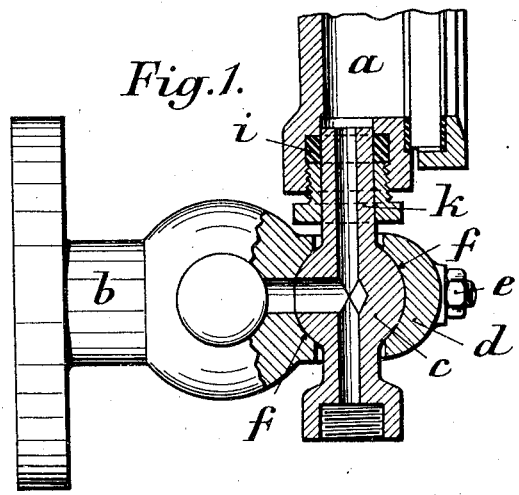
Fig.1.
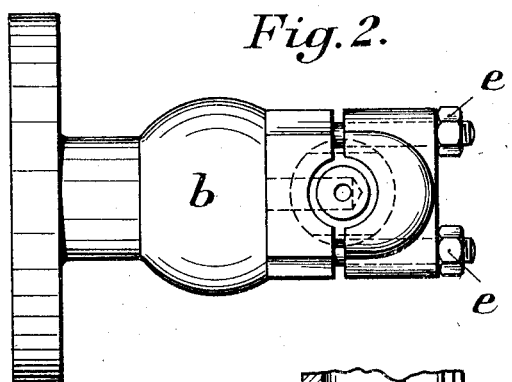
Fig.2.
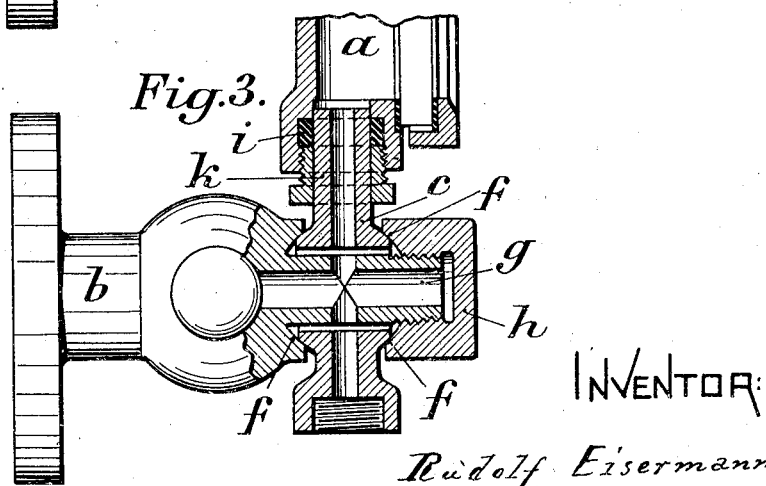
Fig.3.
INVENTOR:
Rudolf Eisermann
By 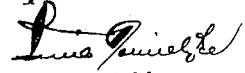
Attorney.

Patented Sept. 24, 1929

1,728,961

UNITED STATES PATENT OFFICE

RUDOLF EISERMANN, OF TEMPELHOF, NEAR BERLIN, GERMANY, ASSIGNOR TO RICH, KLINGER GESELLSCHAFT M. B. H., OF GUMPOLDSKIRCHEN, NEAR WEIN, AUSTRIA, A CORPORATION OF AUSTRIA

LIQUID-LEVEL INDICATOR

Application filed March 30, 1927, Serial No. 179,698, and in Germany July 10, 1925.

The water level indicators hitherto known consisting of water gauge bodies and two arms containing cocks, form a rigid whole, which is rigidly connected with the boiler body by means of gauge arm flanges.

Although in the case of the low steam pressures and temperatures formerly customary in steam boiler work, disturbing leakages showed themselves at the points of connection of the fittings, in the case of the higher steam pressures and temperatures now universally aimed at, the deformations transmitted to the appliance, owing to the distortions of the boiler wall, are absolutely disastrous.

Efforts have been made to meet this difficulty by strengthening the framework of the indicator, but in vain, as the frames made in one piece, in consequence of their low expansibility and flexibility went to pieces at once. As a consequence, breakages of the glass were then still frequent.

Even in the case of the mounting itself, however, excessively high stresses in the framework already frequently showed themselves, since either the connecting flanges on the boiler wall or the framework do not lie in one plane, and during the fastening thereof to the boiler distortions occur and consequently leakages at the body, and these are further increased by the above-mentioned temperature variations. This defect could not be eliminated by interposing lenticular or spherical packings, because these do not admit of longitudinal movement.

The present invention is intended to overcome this disadvantage by connecting the body of the framework to the arms containing the cocks by means of universal joints. By a universal joint connection is here intended to mean a complete ball joint, of which at least one limb is slidably supported in its connecting member. By this means the entire water level indicator itself is made suitable for the highest steam pressures and temperatures.

In the accompanying drawings two constructional examples of the invention are illustrated:

Figure 1 shows the union coupling for a liquid level indicator, partly in section, Figure 2 is a plan of Figure 1, Figure 3 shows another constructional form of a representation corresponding to Figure 1.

The indicator framework according to Figures 1 and 2 consists of a body $a$, and cocks or base portion $b$, which are assembled by means of universal joints. The tube $k$ has an enlargment $c$ which may for example comprise spherical surfaces $f$, and are pressed against seats $f'$ located in the cock casing $b$ by a cover $d$ by means of bolts $e$. By this means the movability of the joint in all directions is ensured.

In Figure 3 the joint member $c$ is mounted upon a cock casing pivot or extension $g$ with freedom of movement, and held by a screw cap $h$. In order to enable the universal joints to be displaced, packings $i$ resembling stuffing boxes are fitted in the body $a$ of the framework, and these packings engage round the pivots $k$ of the universal joints $c$.

What I claim and desire to secure by Letters Patent, is:—

1. A universal joint for a liquid level indicator comprising a tube on which the indicator is attached to permit sliding movement thereon in an axial direction, said tube having an enlargement forming spherical surfaces; a base portion having a spherical surface and an extension; and a cover on said extension having a spherical surface adapted to contact with a spherical surface of the enlargement and to force the enlargement against the spherical surface of the base portion, the spherical surfaces permitting angular adjustment of the indicator.

2. A universal joint for a liquid level indicator comprising a tube having an enlargement forming spherical surfaces; a base portion having a spherical surface and a pivot portion extending through the tube; and a screw cap threaded on the pivot portion and having a spherical surface adapted to contact with a spherical surface of the enlargement, said cap being adapted to force the enlargement against the spherical surface of the tube and the spherical surfaces permitting angular adjustment of the indicator.

In testimony whereof I have affixed my signature.

RUDOLF EISERMANN.